Figure 5:
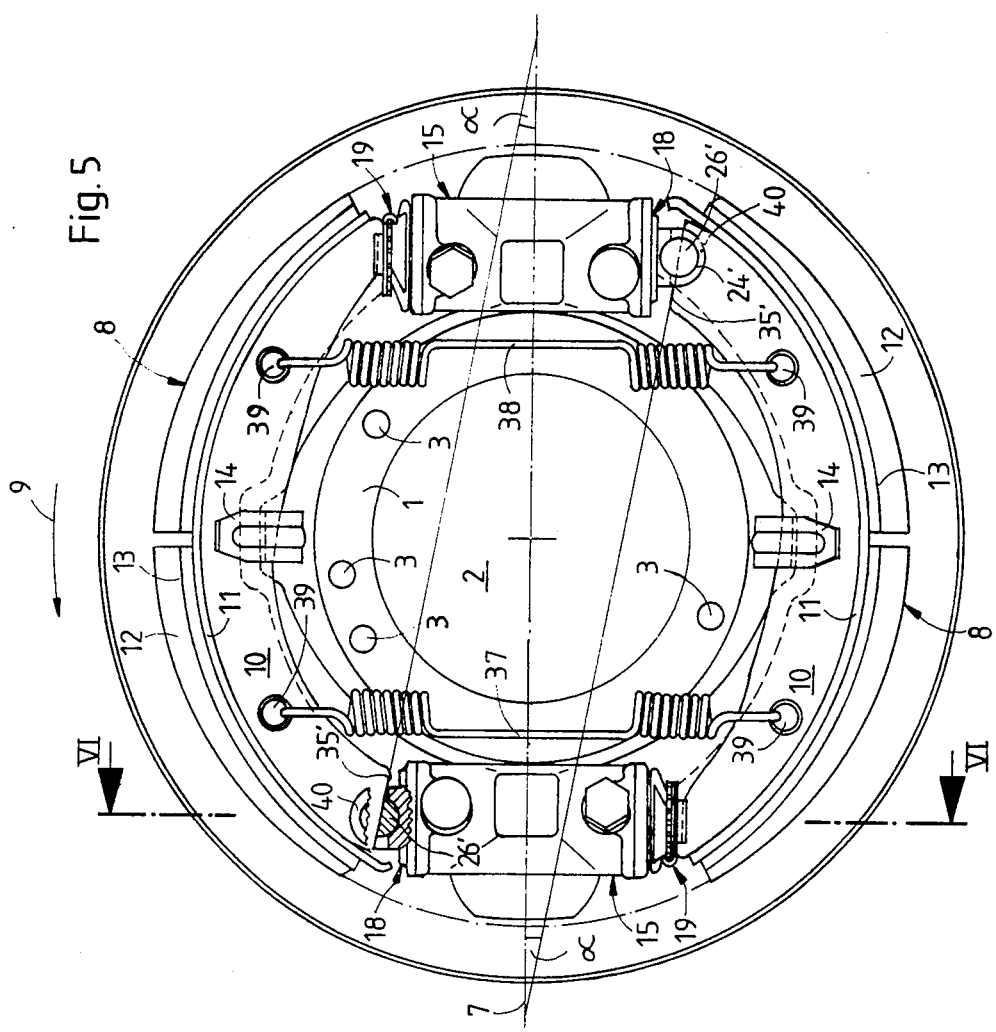

United States Patent [19]

Edwards et al.

[11] Patent Number: 4,730,707
[45] Date of Patent: Mar. 15, 1988

[54] AUTOMOBILE DRUM BRAKE

[75] Inventors: David J. Edwards, Utica, Mich.; Peter Baum, Seligenstadt, Fed. Rep. of Germany

[73] Assignee: Rockwell-Golde GmbH, Fed. Rep. of Germany

[21] Appl. No.: 943,221

[22] Filed: Dec. 18, 1986

[30] Foreign Application Priority Data

Dec. 20, 1985 [DE] Fed. Rep. of Germany ....... 3545235

[51] Int. Cl.$^4$ ............................................. F16D 51/24
[52] U.S. Cl. ..................................... 188/326; 188/327; 188/341; 192/75
[58] Field of Search ............... 188/341, 325, 326, 327, 188/334, 363, 364; 192/75

[56] References Cited

U.S. PATENT DOCUMENTS

| 2,208,293 | 7/1940 | Hayes et al. | 188/341 |
|---|---|---|---|
| 2,269,268 | 1/1942 | Irving | 188/326 |
| 3,136,390 | 6/1964 | Zukowski | 188/341 |
| 3,177,979 | 4/1965 | Powlas | 188/341 |
| 4,184,574 | 1/1980 | England | 188/341 |
| 4,577,733 | 3/1986 | Oguro et al. | 188/334 |

FOREIGN PATENT DOCUMENTS

| 681471 | 3/1964 | Canada | 188/341 |
|---|---|---|---|
| 487316 | 6/1938 | United Kingdom | 188/341 |
| 2062147 | 5/1981 | United Kingdom | 188/327 |

Primary Examiner—George E. A. Halvosa

[57] ABSTRACT

For automobile drum brakes of the simplex and duo-duplex forms of construction, each having two brake shoes (10) floatingly mounted on a brake bracket (1), a special support is proposed for the one end of the brake shoe web (10) of each brake shoe (8), this support being constituted basically of a support pin (26) rotatable about its central axis, which possesses a recessed bearing surface, on which a corresponding counter-surface (35) of the brake shoe web (10) is slidably journalled. The new support makes possible the maintaining of a constant brake coefficient throughout the full range of wear of the brake lining (12).

1 Claim, 8 Drawing Figures

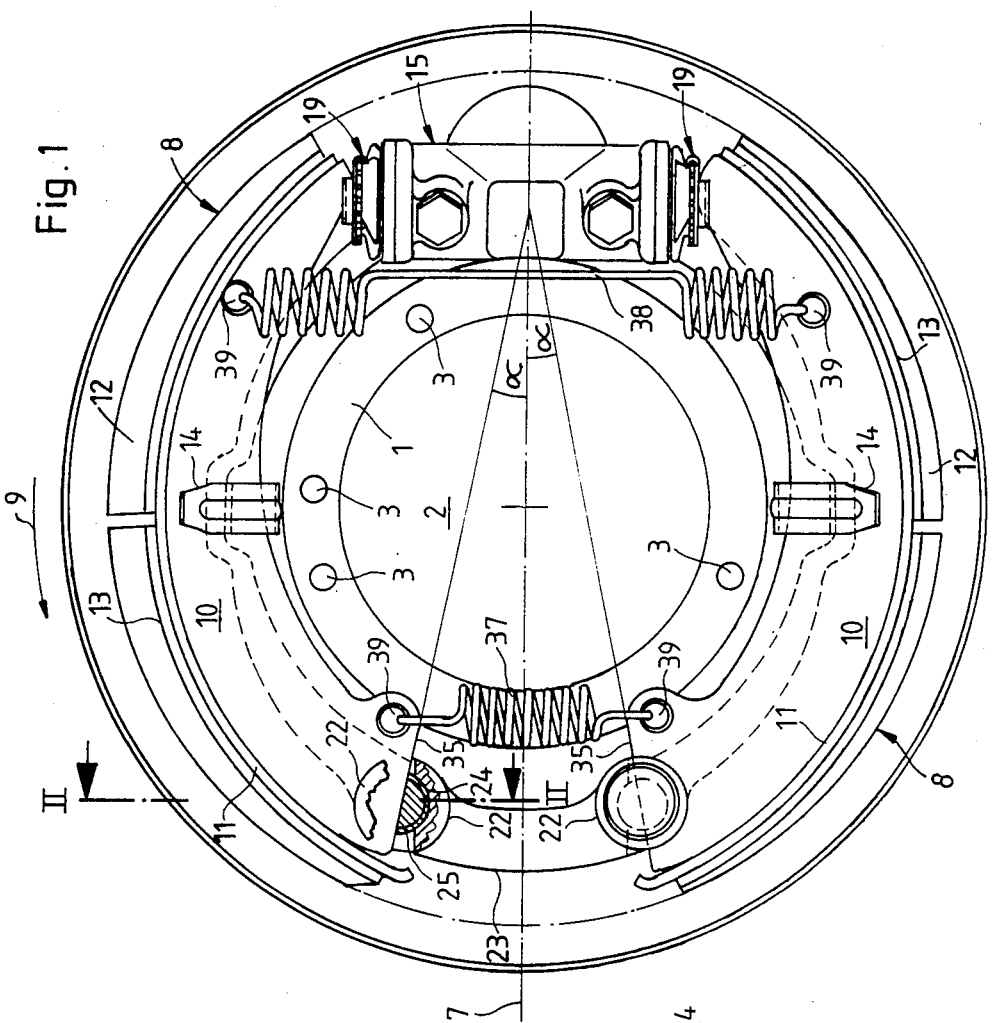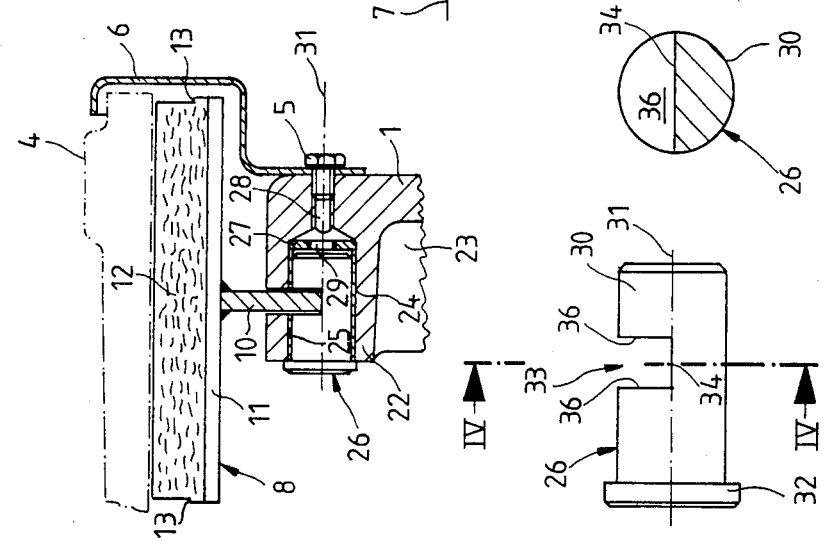

AUTOMOBILE DRUM BRAKE

This invention relates both to an automobile drum brake of the simplex construction and also to an automobile drum bake of the duo-duplex construction, comprising two brake shoes floatingly disposed on a brake bracket. According to this category, in simplex drum brakes, the brake shoes bear slidably with one web end against a tightening device acting in both directions and rigidly mounted on the brake bracket and with the other web end slidably on a support bearing mounted fixed on the brake bracket, and are connected to each other by check springs. According to this category, in the case of duo-duplex drum brakes, the brake shoes bear slidably with both their web ends on two tightening devices, acting in both directions and rigidly mounted diametrally opposite each other on the brake bracket, and are connected to each other by check springs.

Hitherto, in drum brakes of the simplex construction with floating brake shoes, the brake shoe support is provided on a fixed support bearing of the brake bracket, which is equipped with a flat bearing surface, against which the associated brake shoe bears slidably with a convex dome surface formed on the web end. In known drum brakes of the duo-duplex construction with floating brake shoes, correspondingly, a flat bearing which moves when the brake is actuated is disposed on each tightening device, on which bearing the associated brake shoe bears slidably with a convex domed surface formed at the web end. This construction of the drum brakes of the simplex and duo-duplex types each having floating brake shoes possesses the disadvantages listed below.

When wear occurs of the brake lining situated on the external circumferential surfaces of the brake shoes and self-adjustment of the tightening devices takes place, the convex domed web ends not only slide on the flat bearings but also roll on them, with the result that not only do the brake shoes displace relative to the brake bracket but also the bearing points or lines between the convex domed web ends and the flat bearings displace outwards with respect to the brake centre. By this change in position of the bearing points, the brake coefficient C* decreases, starting from new brake linings to worn brake linings, in the case of simplex brakes by approximately 15% and in the case of duo-duplex brakes by as much as 20%, in each case for a constant coefficient of friction $\mu=0.4$. A further disadvantage of the known drum brakes of the types of construction under discussion is to be found in the fact that, due to the bearing at only a point or line of the brake shoes on the flat bearings, high bearing pressures occur in operation, which lead to rapid wear.

The reduction in the brake coefficient C* occurring with increasing wear of the linings has considerable adverse effects in operation. Since the brake coefficient C* is defined as the quotient of the total circumferential force on the brake area divided by the tightening force on the brake shoe, it can be seen that, due to the direct proportionality between brake coefficient and circumferential force, the circumferential force and therefore the braking action decreases for a constant tightening force and constant coefficient of friction. If the circumferential force is not to decrease and the braking action not to become worse, then the tightening force must be increased as the brake coefficient decreases, i.e. higher brake actuating forces must be exerted as the wear of the brake lining increases.

The task underlying the present invention is to provide drum brakes of the initially stated forms of construction, in which the brake coefficient does not change during the life of the brake lining.

The stated task is achieved by two expressions of the concept of this invention, equal in their importance, one related to the initially stated simplex brakes and the other to the initially stated duo-duplex brakes.

The automobile drum brake according to this invention of the simplex construction is characterized in that the support bearings are each formed of a support pin, which is mounted rotatable about its axis orientated perpendicularly to the brake bracket on the brake bracket and is equipped with a bearing surface situated depressed with respect to its circumferential surface, which extends rectilinearly transversely to the axis of the support pin and against which a correspondingly rectilinearly extending counter-surface disposed on the associated end of the brake shoe web is slidably journalled, the counter-surface being orientated convergingly towards the brake centre at an acute angle to the axis of symmetry of the brake bracket.

In its application to an automobile drum brake of the duo-duplex construction, the invention is characterized in that, at each of the tightening devices, a support pin is provided at opposite sides thereof, which pin is mounted on a tightening element of the tightening device rotatable about its axis orientated perpendicularly to the brake bracket, and is equipped with a bearing surface situated depressed with respect to its circumferential surface, which bearing surface extends rectilinearly transversely to the axis of the support pin, and against which a correspondingly rectilinearly extending counter-surface disposed on the associated end of the brake shoe web is slidably journalled, the counter-surface being orientated convergingly towards the centre of the brake at an acute angle to the axis of symmetry of the brake bracket.

In both these equally important drum brakes, when self-adjustment of brake wear at the brake shoes takes place, displacements of the support position on the fixed support bearing (simplex construction) or on the tightening element of the tightening device (duo-duplex construction) no longer take place, because the support pin rotates without change in position, due to the areal pressure of the counter-surface situated on the brake shoe web against the bearing surface of the support pin. Independently of the sliding relative position between the counter-surface situated on the brake shoe web and the bearing surface on the support pin, the support force is always accepted at the same position by the support pin. Changes in the brake coefficient can therefore no longer occur during the life of the brake lining. The method of action of the support pin in cooperation with the counter-surface on the brake shoe web can be compared kinematically with a sliding hinge.

Due to the fact that bearing surface and counter-surface are always in areal contact, only relatively small bearing pressures occur, with the result that the wear at the support points under discussion is considerably reduced.

With advantage, the arrangement is such that the support pin is of cylindrical form and the bearing surface is the base surface of a transverse groove formed in the support pin, against the lateral walls of which groove the brake shoe web is laterally guided. The bearing area necessary for supporting the brake shoe can, in this manner, be very simply provided by the forming of a transverse groove, with the additional advantage that the lateral walls of the transverse groove guide the brake shoe web.

Preferably, the bearing surface and counter-surface are both flat, the axis of rotation of the support pin being situated in the plane of the bearing surface. In the case of a cylindrical support pin and the provision of the bearing surface by a transverse groove, this means that the transverse groove lies recessed with its base surface down as far as the axis of rotation of the support pin.

In a further development of the concept of this invention, the support pin is rotatably mounted in a bearing bushing slit to permit passage of the brake shoe web, in which (bushing), in the case of the simplex construction, is inserted in a seating bore of the brake bracket and, in the duo-duplex construction, in a seating bore of the tightening element, in each case the boundary wall of the seating bore being slit for the passage of the brake shoe web. The use of a bearing bushing made from a suitable material permits a reduction in friction between the support pin and the seating bore in the brake bracket or tightening element respectively, so that the support pin, when a change in position occurs of the associated brake shoe, such as when the brake is actuated, can easily rotate. The slits formed for the passage of the brake shoe web in the bearing bushing and the boundary wall of the seating bore can correspond in their width to the width of the transverse groove in the support pin, with the result that the brake shoe web is additionally guided at these components also.

For the displacement of the brake shoes necessary with self-adjustment for wear, it has been found advantageous if the acute angle between the axis of symmetry of the brake bracket and the counter-surface on the brake shoe web shall be at most 20°, in the new condition of the brake lining of the brake shoes. With increasing wear of the brake linings, the acute angle approaches the value 0°.

In order to make possible a sufficient displacement travel between the bearing surface and counter-surface, the counter-surface on the brake shoe web is advantageously constructed continuous throughout the full depth of the web.

With advantage, the invention can be used for a drum brake in which the tightening device is constructed, in known manner, as a self-adjusting splaying wedge tightening device, such as is frequently encountered in the compressed air actuated drum brakes for goods vehicles.

Figure 6:
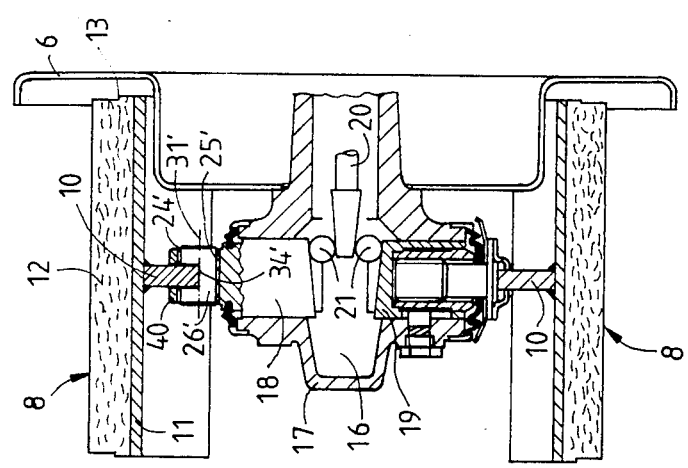
Figure 7:
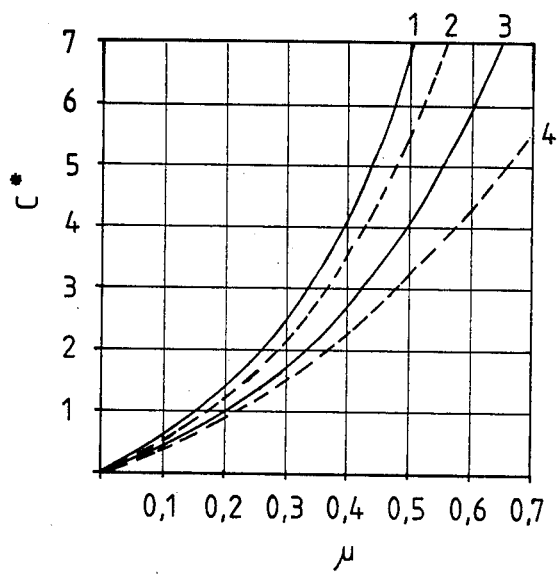
Figure 8:
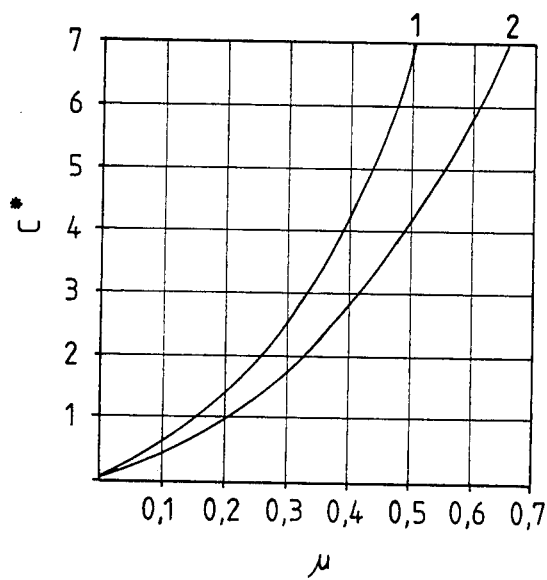

Further features of the invention are explained in greater detail below with reference to the drawings, illustrating examples of embodiment thereof. The Figures in the drawings show:

FIG. 1 A main elevation of a drum brake of the simplex type, illustrated without a brake drum, FIG. 2 A partial section along the line II—II in FIG. 1, FIG. 3 A lateral view of a support pin, FIG. 4 A section along the line IV—IV in FIG. 3, FIG. 5 A main elevation of a drum brake of the duo-duplex type, illustrated without a brake drum, FIG. 6 A partial section along the line VI—VI in FIG. 5, FIG. 7 A graph showing brake coefficient plotted against coefficient of friction for drum brakes of the simplex and duo-duplex types according to the state of the art, and FIG. 8 A further graph showing brake coefficient plotted against coefficient of friction for drum brakes of the simplex and duo-duplex types according to this invention.

In the simplex brake illustrated in FIGS. 1 and 2, a brake bracket 1 is provided, which possesses at its centre an aperture for fitting the brake to an automobile axle (not shown). The aperture 2 is surrounded by a ring of fixing bores 3, which serve for fixing the brake bracket to a non-rotating part of the axle construction and of which only a few are shown. Concentrically to the brake bracket 1, the brake drum 4, indicated in FIG. 2 in dot-and-dash line, is disposed, which is connected in the usual manner rotatably keyed to a rotating component of the axle construction. A dust shield 6, fixed to the brake bracket 1 by bolts 5 and extending over the brake drum 4, protects the interior of the drum brake towards the inside of the vehicle.

The brake is of substantially symmetrical construction with respect to the axis of symmetry 7 shown in FIG. 1. Two identical brake shoes 8 are floatingly mounted on the brake bracket, of which the upper brake shoe in FIG. 1 is the leading brake shoe with respect to the rotational direction of the drum indicated by an arrow 9, whereas the lower brake shoe represents the trailing brake shoe with respect to the rotational direction of the arrow 9. The brake shoes 8 are composed, in the usual manner, each of a brake shoe web 10, a brake shoe plate 11, rigidly connected therewith, and a brake lining 12, formed in two parts in the example illustrated and fixed to the outer periphery of the brake shoe plate. In the example shown, the brake lining 12 is illustrated in the new condition. The worn condition is denoted by the worn edges 13, shown in the drawings. The guidance of the brake shoes 8, bearing slidably partly against the brake bracket 1 with their brake shoe webs 10, on the brake bracket 1, is provided by brake shoe retaining clips 14, fixed to the brake bracket, which bear resiliently against the brake shoe webs 10.

The brake shoes 8 bear, with their ends of the brake shoe webs 10 to the right in FIG. 1, slidably on a tightening device 15, acting in both directions and mounted rigidly on the brake bracket 1. The tightening device 15 may be constructed, according to FIG. 6, as a splaying wedge unit, and consists of a housing 17, formed on the brake bracket 1 and enclosing a space 16, of the tightening elements constructed as stop piston 18 and re-adjustment piston 19, of the splaying wedge 20, longitudinally slidable for brake actuation, and of the rollers 21, which are normally retained in a cage (not shown) and which transmit the actuating forces from the inclined surfaces of the splaying wedge 20 to corresponding inclined surfaces formed on the stop piston 18 and re-adjustment piston 19. For this purpose, the coaxial pistons 18, 19 project with their inner ends into the space 16, into which also the splaying wedge 20 engages. The re-adjustment piston 19 ensures an automatic re-adjustment of the corresponding brake shoe with reference to the brake drum 4 with increasing wear of the brake lining 12.

Tightening devices 15 of this type are known (e.g. DE-PS No. 33 03 576) and therefore do not need a more detailed description here. As a difference from the tightening device described in relation to FIG. 6, the tightening device 15 used in the case of a simplex drum brake according to FIG. 1 possesses, instead of the stop piston 18, a further re-adjustment piston 19.

For explaining the bearing of the ends of the brake shoe webs 10 to the left in FIG. 1, according to this invention, reference is now again made to FIGS. 1 and 2. In the region of these web ends, the brake bracket 1 possesses generally cylindrical projections 22, which are stiffened against one another by a connecting rib 23. In each of the projections 22, there is a seating bore 24, orientated perpendicularly to the brake bracket 1, into which bore a bearing bushing 25 is inserted. In the bearing bushing 25, a support pin 26, to be explained in greater detail below, is rotatably mounted. An expelling washer 27, which bears against the inner end face of the bearing bushing 25, is introduced as far as the end of the cylindrical region of the seating bore 24. Coaxially with the seating bore 24 and forming with it a through, stepped bore, a threaded bore 28 is formed in the brake bracket 1, which threaded bore serves both for seating one of the screws 5 for fixing the dust shield 6 and also for enabling the support pin 26 to be pushed out when its removal is desired. For this latter purpose, instead of the screw 5, a threaded pin is screwed into the threaded bore 28, which pin can pass through a central opening 29 in the expelling washer 27 and be pressed against the end face of the support pin 26. After removal of the support pin 26 from the bearing bushing, the bearing bushing also can be pulled out, which may become necessary when wear occurs, by the screwing of a pulling tool into the central opening 29 furnished with a thread from the side where the support pin has been removed. In this extraction operation, the pulled-out expelling washer 27 moves the bearing bushing 25. It is, of course, only possible to extract the support pin 26 and bearing bushing 25 from the seating bore 24 when the brake shoes 8 have previously been removed.

The support pin 26 is substantially of cylindrical form and possesses, in its cylindrical region 30, an external diameter so adapted to the internal diameter of the bearing bushing 25 that the support pin 26 is rotatable about its central axis 31 in the seating bore 24 and bearing bushing 25. At its outer end, the support pin 26 is equipped with a head 32, which limits the depth of penetration of the support pin 26 into the seating bore 24.

As can be seen especially from the larger-scale FIGS. 3 and 4, a transverse groove 33 is present in the cylindrical region 30 of the support pin 26, this groove ending with its base surface 34 at the central axis 31. The plane base surface 34 constitutes the bearing surface for the associated brake shoe web 10. In order that the brake shoe web 10 can enter the transverse groove 33, both the boundary wall of the seating bore 24 formed by the projection 22 and also the bearing bushing 25 are slit, as can be seen from FIGS. 1 and 2.

The brake shoe web 10 possesses, at its end towards the support pin 26, a plane counter-surface 35 (FIG. 1) continuous through the full depth of the web, which surface bears slidably in areal contact against the bearing surface of the support pin 26 formed by the base surface 34. As FIG. 1 shows, the counter-surface 35 is orientated convergingly towards the centre of the brake at an acute angle $\alpha$ to the axis of symmetry 7. The brake shoe web 10 is, additionally to its guidance provided by the brake shoe retaining clip 14, also guided by the lateral walls 36 of the transverse groove 33 in the support pin 26 and by the corresponding slit walls in the bearing bushing 25 and projection 22.

Insofar as, in the above description, reference has been made only to one half of the brake, this description applies to the other side of the brake also, on account of the symmetry of the brake assembly. The two brake shoes 8 are permanently pressed both against the support pins 26 and against the re-adjustment pistons 19 of the tightening device 15, by check springs 37 and 38, which are hooked with their ends into bores 39 in the brake shoe webs 10.

For a description of the drum brake of the duo-duplex construction, reference is now made to FIGS. 5 and 6, the reference numerals hitherto used for the individual components being retained for the designation of corresponding components. The duo-duplex drum brake does not possess any fixed support bearings on the brake bracket 1 for supporting the brake shoes 8, but instead has a further tightening device 15, so that two tightening devices 15 are diametrally opposite each other. Each brake shoe 8 bears, with its brake shoe web 10, on the stop piston 18 of the one tightening device 15 and on the re-adjustment piston 19 on the other tightening device 15. The two tightening devices 15 are therefore in mutually opposite positions with respect to the axis of symmetry 7 in regard to their stop pistons and re-adjustment pistons.

The two stop pistons 18 each possess, at their outer ends, a projection 40, through which a seating bore 24' passes in a direction perpendicular to the brake bracket 1. In the seating bore 24' there is, here again, a bearing bushing 25', in which a support pin 26' is rotatably journalled. In this case also, the support pin 26' is furnished with a transverse groove corresponding to the transverse groove 33 and not referenced here, which is at such a depth with its base surface 34' that the rotational and central axis 31' of the support pin 26' is situated in the plane of the flat base surface 34'. In this case also, the boundary wall of the seating bore 24' formed by the projection 40 and the bearing bushing 25' are slit to permit passage and guidance of the brake shoe web 10 correspondingly to the transverse groove in the support pin 26'.

In this example also, each brake shoe 8 possesses, at one end of its brake shoe web 10, a counter-surface 35', orientated in a straight line and of flat form, which bears slidably in areal contact on the bearing surface formed by the base surface 34' of the groove at the support pin 26' and is orientated convergingly towards the centre of the brake at an acute angle $\alpha$ to the axis of symmetry 7 of the brake bracket 1.

In both the forms of the construction described, the acute angle $\alpha$ between the axis of symmetry 7 of the brake bracket 1 and the counter-surface 35, 35' respectively on the brake shoe web, is at most 20° in the new condition of the brake lining.

Due to the bearing of the brake shoes in the manner of sliding hinges against the support pins 26, 26' of the two brake constructions described, the support pins constitute, when the brake is actuated, pivot bearings for the brake shoes 8, the rotational axis 31, 31' of which does not change its position even as the wear of the brake lining increases. When wear occurs, which is compensated by the re-adjustment pistons 19, the brake shoes 8 slide with their counter-surfaces 35, 35' respectively on the associated bearing surfaces formed by the groove bases 34, 34' respectively towards the brake drum, with the result that the brake shoes always remain in a centered position with respect to the brake drum.

By the described support arrangement the result is obtained that the brake coefficient C* does not vary during the life of the brake linings, i.e. it remains constant. This is illustrated in the graph of FIG. 8. In this graph, the coefficient of friction $\mu$ is plotted on the abscissa and the coefficient C* on the ordinate. The curve 1 is valid for the more effective duo-duplex drum brake, whereas curve 2 relates to the simplex drum brake. It can be seen that, for a constant coefficient of friction $\mu$, which normally is about 0.4, the coefficient C* is constant at about 4.2 (for duo-duplex) and at 2.8 (for simplex).

FIG. 7 shows a comparative diagram for a simplex drum brake and a duo-duplex drum brake according to the state of the art, which are constructed in the same manner as the brakes according to this invention, with the exception of the support situation. In this graph, curve 1 shows the duo-duplex brake with a new brake lining, and curve 2 the same brake with a worn lining, curve 3 the simplex drum brake with a new brake lining and curve 4 the same brake with the worn brake lining. As can be seen, in the case of the duo-duplex drum brake, for a coefficient of friction assumed constant at $\mu=0.4$, the coefficient C* falls from an initial value of approx. 4.2 to approx. 3.4. The fall in the case of the simplex drum brake is from an initial value of approximately 2.6 to approximately 2.2.

We claim:

1. In an automobile drum brake of the duo-duplex type comprising two brake shoes floatingly disposed on a brake bracket, a web supporting each brake shoe, each shoe slidably supported on tightening devices and each brake shoe being rigidly mounted diametrically opposite the other on the brake bracket and said two brake shoes being slidably movable against a support bearing mounted on the brake bracket with the ends of the supporting webs being connected by springs, that improvement consisting of:

each said tightening device for each brake shoe comprising a self-adjusting tightening device including piston means connected to the supporting web for said brake shoes and adapted to tighten as well as loosen said brake shoes in one direction away from each other and in another direction toward each other;

a seating bore in the piston means of each of the tightening devices adapted to receive a bushing;

a bushing in each of said seating bores;

a support pin rotatably journalled in each said bushing;

each said bushing having a slit for passage of one of the brake shoe webs;

said support pins serving as support bearings for said webs of said brake shoes which are mounted about an axis of rotation of said pin which is oriented parallel to the rotational axis of the brake;

each said support bearing having a depressed bearing surface in the form of a transverse groove in said pin formed in said support pin below a circumferential surface thereof whereby said bearing surface extends transversely and rectilinearly to the axis of said support pin in which groove said brake shoe is laterally guided;

each of said brake shoe webs having a counter surface which extends rectilinearly on the associated end of said web of said brake shoe;

said counter surface being oriented at an acute converging angle toward the center of said brake, said converging acute angle being measured between the counter surface and the axis of symmetry of said brake bracket and being less than 20°;

said bearing surface and said counter surface both being flat; and the axis of rotation of said support pin being located in the plane of said bearing surface.

* * * * *